United States Patent
Dyott et al.

[11] 3,957,343
[45] May 18, 1976

[54] OPTICAL COMMUNICATIONS SYSTEMS

[75] Inventors: Richard Burnaby Dyott; John Leslie Stevenson, both of London, England

[73] Assignee: The Post Office, London, England

[22] Filed: Apr. 11, 1975

[21] Appl. No.: 567,429

Related U.S. Application Data

[63] Continuation of Ser. No. 417,052, Nov. 19, 1973, abandoned.

[30] Foreign Application Priority Data
Nov. 24, 1972 United Kingdom............... 54412/72

[52] U.S. Cl. .......................... 350/96 WG; 350/96 C
[51] Int. Cl.² .......................................... G02B 5/14
[58] Field of Search ..................... 350/96 WG, 96 C

[56] References Cited
UNITED STATES PATENTS

| | | | |
|---|---|---|---|
| 3,531,185 | 10/1967 | Buchsbaum et al. | 350/179 |
| 3,666,348 | 5/1972 | Marcatili | 350/96 WG |
| 3,723,921 | 3/1973 | Rowe et al. | 350/96 WG X |
| 3,764,195 | 10/1973 | Blank et al. | 350/96 WG |
| 3,770,339 | 11/1973 | Ramaswamy | 350/96 WG X |

*Primary Examiner*—John K. Corbin
*Assistant Examiner*—Stewart Levy
*Attorney, Agent, or Firm*—Kemon, Palmer & Estabrook

[57] ABSTRACT

Energy propagating in a dielectric optical waveguide may be transferred from one mode of propagation to another by inducing a spatially undulatory variation in refractive index in the core of the dielectric optical waveguide. Such a variation may be induced by an electro-static field. The electro-static field may be directed either longitudinally of, or transversely of the dielectric optical waveguide. A suitably periodic electro-static field may be generated by positioning a suitable electrode structure about the dielectric optical waveguide. For certain applications it may be desirable to arrange for the spatial period of the electro-static field to vary in a random manner. By arranging for propagating modes to couple to non-propagating modes an optical modulator may be produced.

28 Claims, 4 Drawing Figures

OPTICAL COMMUNICATIONS SYSTEMS

This is a continuation of application Ser. No. 417,052 filed Nov. 19, 1973, and now abandoned.

The present invention relates to a method of, and apparatus for, transferring energy between modes in a dielectric optical waveguide.

The terms "light" and "optical" as used in this specification are to be understood as referring to those regions of the electro-magnetic spectrum more usually designated as the infra-red, visible, and ultra-violet.

The term "mode" as used herein includes both propagating and non-propagating modes, a non-propagating mode being a mode in which the light is not guided by the dielectric optical waveguide, ie in which the light is radiated out of the guide.

One of the chief problems in the use of multi-mode dielectric optical waveguides for telecommunications, is the limit imposed on the information carrying capacity by group dispersion. Group dispersion is caused by the light propagating in different modes, having different velocities of propagation. This means that if, a train of pulses, say, is transmitted along a dielectric optical waveguide, the pulses become smeared out after travelling a certain distance because marks propagating in one mode have caught up with spaces propagating in another mode. This disadvantage can be avoided by the use of monomode fibres, however there are certain construction and cost problems associated with this solution to the problem, particularly if it is desired to use liquid cored dielectric optical waveguides.

Another approach to the problem is to ensure that light is not transmitted for any great distance in a single mode. In other words to transfer light energy between the modes so that, the mean velocity of transmission along the entire length of the waveguide is a constant. If this can be achieved the effects of group dispersion can be at least partially avoided.

Accordingly it is a first object of the invention to provide a method of, and apparatus for, transferring light propagating in a dielectric optical waveguide between modes so that the effects of group dispersion in smearing out intelligence carried by the light is at least partially eliminated.

The modes associated with a dielectric optical waveguide can be divided into two groups:
a. propagating modes, and
b. non-propagating modes.

Propagating modes are those in which the waveguide exerts a guiding action on the light, i.e., the light is physically confined to the guide. Non-propagating modes are modes in which the waveguide does not exert a guiding action, i.e., light in these modes is not physically bound to the waveguide. Thus if it is possible to construct a device for transferring light from one mode to another, the same device can act as a modulator by transferring light from a propagating mode to a non-propagating mode.

Accordingly it is a second or alternative object of the invention to provide a method of and apparatus for modulating light carried by a dielectric optical waveguide, by transferring light between a propagating and a non-propagating mode.

According to a first aspect of the invention there is provided a mode coupler for transferring energy between different modes of propagation in a dielectric optical waveguide having a core and a cladding comprising a section of dielectric optical waveguide having a core wherein refractive index varies as a function of position in a spatially undulatory manner, said variations of refractive index caused by a spatially undulatory electric field.

According to a second aspect of the invention there is provided a method of transferring energy between different modes of propagation in a dielectric optical waveguide having a core and a cladding wherein a spatially undulatory variation of refractive index is created in the core of the dielectric optical waveguide by a spatially undulatory variation in electric field.

According to a third aspect of the present invention there is provided a mode coupler for transferring energy between different modes of propagation in a dielectric optical waveguide, comprising a section of dielectric optical waveguide having a plate electrode disposed tangentially adjacent a surface of said section of dielectric optical waveguide, a plurality of strip electrodes disposed tangentially adjacent said surface of said section of dielectric optical waveguide in a serial array along said section of dielectric optical waveguide, each of said strip electrodes disposed axially transverse of said section of dielectric optical waveguide, said plurality of strip electrodes electrically isolated from said plate electrode.

According to a fourth aspect of the present invention there is provided a mode coupler for transferring energy between different modes of propagation in a dielectric optical waveguide, comprising a section of dielectric optical waveguide having a first group and a second group of strip electrodes disposed tangentially adjacent said surface of said section of dielectric optical waveguide in serial arrays along said section of dielectric optical waveguide, each of said strip electrodes disposed axially transverse of said section of dielectric optical waveguide, each strip electrode of said first group disposed diametrically opposite with respect to said dielectric optical waveguide a strip electrode of said second group, said first group of strip electrodes electrically isolated from said second group of strip electrodes.

According to a fifth aspect of the present invention there is provided a mode coupler for transferring energy between different modes of propagation in a dielectric optical waveguide comprises a section of dielectric optical waveguide having a plurality of ring electrodes arranged in a serial array axially of said section of dielectric optical waveguide, each ring electrode disposed circumjacent a surface of said section of dielectric optical waveguide.

An embodiment of the invention will now be described, by way of example, with reference to the accompanying drawings in which.

Figure 4:
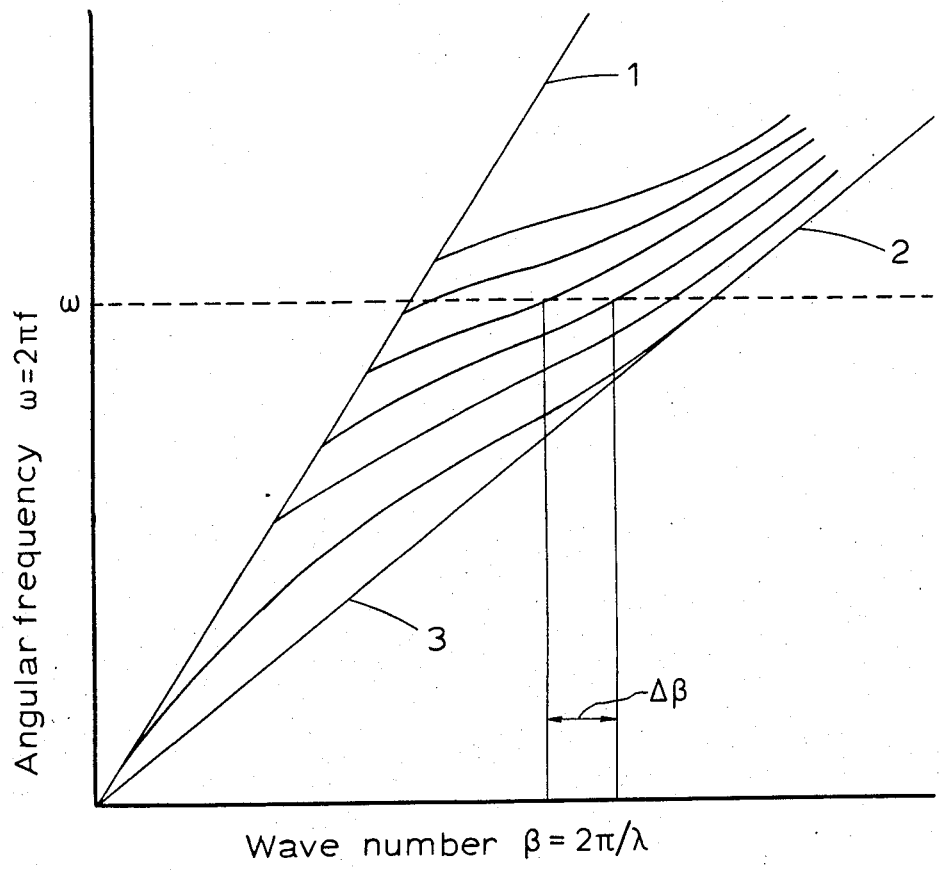

FIG. 4 whows a graph of angular-frequency against wave number for the different modes of propagation in a dielectric optical waveguide.

Figure 1:
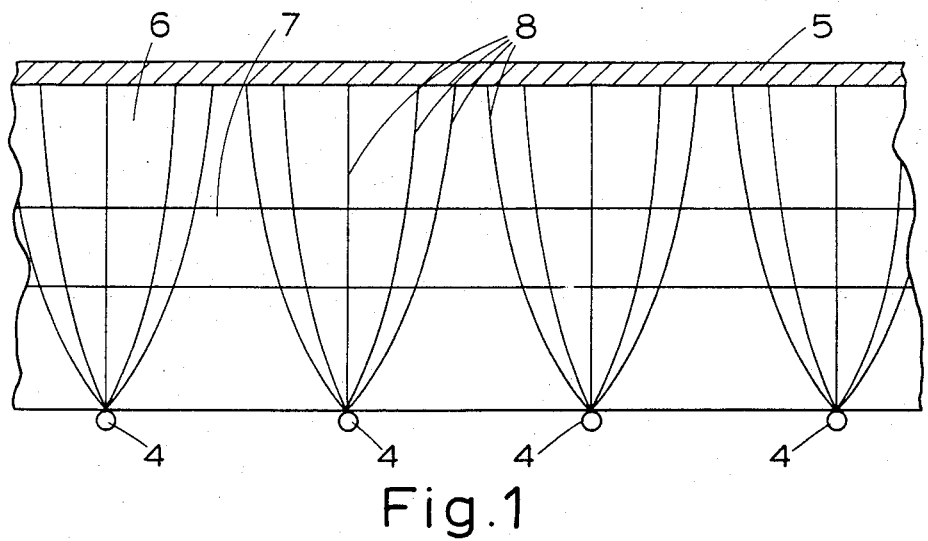
FIG. 1 shows a mode mixer in which an electric field axially transverse of the dielectric optical waveguide is used to generate spatially undulatory refractive index variations.

If any sort of periodic structure is present in a dielectric optical waveguide, the light propagating in the waveguide will interact with the structure. This usually results in a mixing up of the modes propagated in the waveguide, i.e., transfer of energy from one mode to another or even the loss of light from the waveguide because of decoupling. A device for inducing a periodic structure in the waveguide is shown in FIG. 1. In this case the periodic structure is an electrically induced periodic variation in refractive index. A dielectric optical waveguide of circular cross-section, having a core 7 and a cladding 6 is arranged between a plate electrode 5 and a serial array of strip electrodes 4. The strip electrodes 4 are arranged axially transverse of the direction of propagation of light along the dielectric optical waveguide. The strip electrodes 4 are a wire grid across which the dielectric optical waveguide is laid. The dielectric optical waveguide has a core of nitrobenzene (liquid) and a cladding of soda-lime glass. The wire grid 4 is maintained at a high positive potential with respect to the plate electrode 5. This has the effect of generating a spatially undulatory electric field 8 in the core of the dielectric optical waveguide. The electric field thus produced is substantially transverse to the direction of propagation of light in the dielectric optical waveguide. Since for all materials the refractive index is to a greater or lesser extent variable with applied electric field, a periodic variation of refractive index is induced in the core of the dielectric optical waveguide. Typically a dielectric optical waveguide used in this device may have a diameter of 100 microns, and the applied voltage may be 500 volts, so that if the electrodes are placed tangentially adjacent the dielectric optical waveguide, a field of the order of $5 \times 10^6$ volts/meters is induced.

Figure 2:
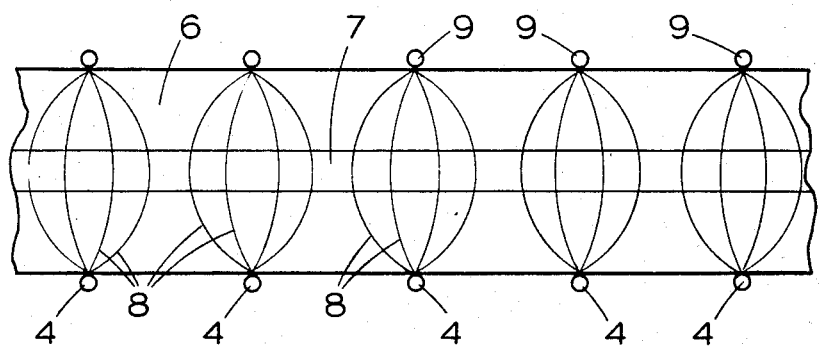
FIG. 2 shows a second embodiment of a mode mixer in which an electric field axially transverse of the dielectric optical waveguide is used to generate spatially undulatory refractive index variations.

The electrode system of FIG. 1 may be replaced by the electrode system shown in FIG. 2. In this embodiment the plate electrode is replaced by a second serial array of strip electrodes 9. Each strip electrode 9 is positioned diametrically opposite a strip electrode 4. The field produced by two sets of strip electrodes is more nearly axially transverse of the dielectric optical waveguide than in the case where a single serial array of strip electrodes is used in conjunction with a plate electrode.

Figure 3:
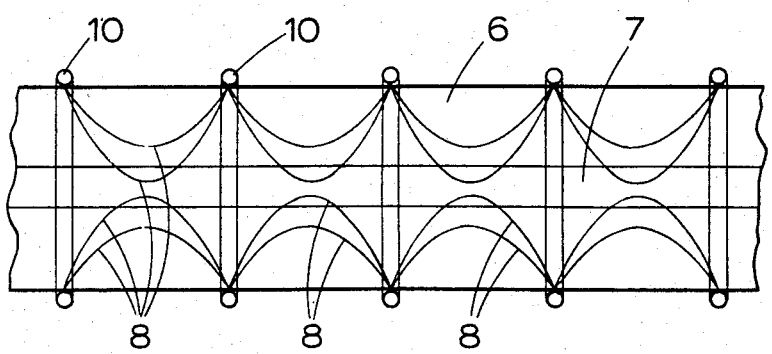
FIG. 3 shows a mode mixer in which an electric field axially directed relative to the dielectric optical waveguide is used to generate spatially undulatory refractive index variations.

If the electrode configuration of FIG. 3 is used the spatially undulatory electric field produced is substantially parallel to the direction of propagation. In this embodiment a serial array of ring electrodes 10 is used. Adjacent electrodes are connected to potentials of opposite polarity so that the electric field 8, is directed, in the core, in a direction substantially parallel to the direction of propagation. With this particular electrode configuration, a solid core of crystalline metanitroanaline may be used. The metanitroanaline, which crystallizes in an orthorhombic form (with a symmetry defined by the point group mm2) is arranged so that its c-axis is parallel to the direction of propagation in the dielectric optical waveguide. When metanitroanaline is used as the core material, a cladding of lead flint glass, is employed so that the refractive index difference between core and cladding is not too great.

If the device is intended merely to couple two modes together the electric field and resultant refractive index variations should have a regular periodic structure. This is achieved by using equi-spaced electrodes in the serial arrays of electrodes. However if the device is to be used for mode mixing or as a modulator a regular period associated with the electric field may result in inadequate mixing or weak modulation unless the length of dielectric optical waveguide to which the spatially undulatory field is applied is excessive. This effect can be partially offset by varying the relative position of the electrodes, between certain limits, in a random manner, so that the resultant electric field has a pseudo-random structure. The cause of this effect will be discussed later.

The electrode systems for use with the mode mixers illustrated in FIGS. 1–3 may be formed on the dielectric optical waveguide by a photo-lithographic technique. The photo-resist may be exposed to a light pattern generated by a suitable mask, or alternatively interference fringe patterns may be generated using a suitable monochromatic light source, e.g., a laser. Under certain circumstances it may be advantageous to rotate the dielectric optical waveguide during exposure of the photo-resist.

The mode of actions of the mode couplers described above can be explained by an approximate theory. In FIG. 4, angular frequency, $\omega = 2\pi f$, is plotted against the wave number, $\beta = 2\pi/\lambda$ to give a family of dispersion curves for the propagation of different modes of a dielectric optical waveguide. The two limiting lines 1 and 2 represent the velocity of light in the cladding and core respectively. Line 3 indicates the $HE_{11}$ mode, which is the fundamental mode. In order to transfer energy from one mode to an adjacent mode it is necessary to shift the wave number by $\Delta\beta$. An approximate value for $\Delta\beta$ can be obtained in the following way. The extreme values of $\beta$ for propagation in the core and cladding, $\beta_1$ and $\beta_2$ are given by $$\beta_1 = \frac{2\pi n_1}{\lambda_0} \text{ and } \beta_2 = \frac{2\pi n_2}{\lambda_0} \qquad .1$$

where $\lambda_0$ is the free space wavelength of the light, $n_1$ is the core refractive index and $n_2$ is the cladding refractive index.

$$\text{Therefore, } \beta_1 - \beta_2 = \frac{2\pi}{\lambda_0}(n_1 - n_2) \qquad .2$$

Now the number of modes $N$ carried by a multi-mode dielectric waveguide is:

$$N \simeq \frac{V^2}{2} \text{ where } V = \frac{2\pi\alpha}{\lambda_0}(n_1^2 - n_2^2)^{1/2} \qquad .3$$

where, $\alpha$ is the core radius $$\text{Therefore, } N \simeq \frac{1}{2}\left(\frac{2\pi\alpha}{\lambda_0}\right)^2 (n_1^2 - n_2^2) \qquad .4$$

The difference in $\beta$, $\Delta\beta$ between the modes is approximately given by $$\Delta\beta = \frac{\beta_1 - \beta_2}{N} = \frac{\left(\frac{2\pi}{\lambda_0}\right)(n_1 - n_2)}{\frac{1}{2}\left(\frac{2\pi\alpha}{\lambda_0}\right)^2 (n_1^2 - n_2^2)} \qquad .5$$

Therefore, $\Delta\beta = \dfrac{\lambda_o}{\pi a^2(n_1+n_2)}$

If a periodicity is introduced into the waveguide such that $$\Delta\beta = \dfrac{2\pi}{\lambda_p} \qquad .6$$

where $\lambda p$ is the periodic pitch, it is to be expected that some sort of coupling between the modes will occur. Combining equations (5) and (6) gives $$\lambda_p = \dfrac{2\pi^2 a^2}{\lambda_o}(n_1+n_2)$$

On the basis of the simple theory above it might be supposed that if $\lambda p$ has a value sufficient to ensure intermode coupling, then light would be progressively coupled through all the propagating modes and then into non-propagating modes. However in reality the last few propagating modes have a value of $\Delta\beta$ greater than that for the low order modes. Thus it is possible to choose $\Delta\beta$ so that some intermode coupling occurs but there is no coupling of light out of the waveguide.

The mode couplers described can be used, not only for intermode coupling, to reduce the group dispersion effect, but also as modulators. By varying the electric potential applied between the electrodes, the intensity of the light allowed to propagate in the waveguide is varied. The periodic pitch of the refractive index variations must of course be sufficiently small to ensure that light is coupled out of the waveguide. The device thus acts in a similar manner to a variable attenuator. There is of course no reason why the device when used as a modulator, should not be used with monomode dielectric optical waveguides.

Because $\Delta\beta$ is larger for the high order modes than for the low order modes, the simple theory discussed above cannot be used to calculate the value of $\Delta\beta$ to be used in a modulator. It can be shown by an approximate theory that the criterion for intercoupling the modes so that the highest order mode is coupled out of the core, is given by:

$$\dfrac{\Delta\beta}{\beta} \simeq \dfrac{\pi\delta}{V}$$

where $\Delta\beta = \dfrac{2\pi}{\lambda_p}$; $\beta = \dfrac{2\pi n_1}{\lambda_o}$; $\delta = 1 - \left(\dfrac{n_2}{n_1}\right)^2$ and $V = \dfrac{2\pi a}{\lambda_o}(n_1^2-n_2^2)^{1/2}$ A periodic variation of index of pitch $\lambda p$ thus calculated will eventually couple all modes out of the core into the radiation field. It seems experimentally, however, to be a slow process needing a long length of dielectric optical waveguide exposed to a spatially undulatory electric field. This may well be because a well-defined pitch will only couple strongly those modes whose propagation constants $\beta_1$ and $\beta_2$ differ by $\Delta\beta$. Although there is almost a continuum of modes and although it follows that all modes must eventually be coupled out, it may need some distance of fibre to accomplish this.

Two possible alternatives are:

a. vary the pitch 80 $p$ in a random fashion about the mean value as calculated. This will spread the values of $\Delta\beta$ and hasten the mode coupling;

b. make $\Delta\beta$ large enough to couple the lowest order mode directly to the radiation field.

In which case:

$$\Delta\beta \geq \dfrac{2\pi}{\lambda_o}(n_1-n_2)$$

$$\lambda_p \leq \dfrac{\lambda_o}{n_1-n_2}$$

This last method is the most effective.

What we claim is:

1. A mode coupler for transferring energy between different modes of propagation in a dielectric optical waveguide having a core of homogeneous phase and a cladding comprising:

a section of dielectric optical waveguide of substantially circular cross-section having a core, said core being of a type whose refractive index varies in response to the presence of an electric field; and electrodes disposed on an external surface of the said cladding for applying an electric field to said core, said field being characterized by undulatory variations spaced along a direction of propagation in said wave guide to produce undulatory variations in the refractive index of said core correspondingly spaced along said core in said direction.

2. A mode coupler as defined by claim 1 wherein said core of said section of dielectric optical waveguide is nitrobenzene.

3. A mode coupler as defined by claim 1 in which said electrodes for applying said field to said core includes first and second groups of electrodes disposed adjacent said section of dielectric optical waveguide, said first group being electrically isolated from said second group and means for applying a potential difference between said first and second groups.

4. A mode coupler as defined by claim 3 wherein said first group of electrodes comprising a regular array of strip electrodes transverse said direction of propagation and said second group of electrodes comprises a single plate electrode diametrically opposed to, and electrically isolated from, said first group of electrodes.

5. A mode coupler as defined by claim 3 wherein said first and second groups of electrodes comprises regular arrays of strip electrodes transverse to said direction or propagation, each strip electrode of said first group having a single strip electrode of said second group disposed diametrically opposite with respect to said section of dielectric optical waveguide.

6. A mode coupler as defined by claim 3 wherein said first group of electrodes comprises a pseudo-random array of strip electrodes transverse to said direction of propagation and said second group of electrodes comprises a simple plate electrode diametrically opposed to, and electrically isolated from, said first group of electrodes.

7. A mode coupler as defined by claim 1 wherein said spatially undulatory electric field has a pseudo-random structure.

8. A mode coupler as defined by claim 7 in which said electrodes for applying said field to said core includes first and second groups of electrodes disposed adjacent said section of dielectrical waveguide, said first group being electrically isolated from said second group and means for applying a potential difference between said first and second groups.

9. A mode coupler as defined by claim 8 wherein said first and second groups of electrodes comprises pseudo-random arrays of strip electrodes transverse said direction of propagation, each strip electrode of said first group having a single strip electrode of said second group disposed diametrically opposite with respect to said section of dielectric optical waveguide.

10. A mode coupler as defined by claim 1 wherein said electric field is parallel to said direction of said propagation.

11. A mode coupler as defined by claim 10 wherein said undulatory electric field has a regular periodic structure.

12. A mode coupler as defined by claim 11 in which said electrodes for applying said field to said core includes first and second groups of electrodes disposed adjacent said section of dielectric optical waveguide, said first group being electrically isolated from said second group and means for applying a potential difference between said first and second groups.

13. A mode coupler as defined by claim 12 wherein each electrode of said first group and second group comprises a ring electrode disposed coaxially with respect to said section of dielectric optical waveguide, said ring electrodes disposed in a regular serial array in a direction parallel to said direction of propagation such that electrodes of said first group alternate with electrodes of said second group.

14. A mode coupler as defined by claim 10 wherein said undulatory electric field has a pseudo-random periodic structure.

15. A mode coupler as defined by claim 14 in which said means for applying said field to said core includes first and second groups of electrodes disposed adjacent said section of dielectric optical waveguide, said first group being electrically isolated from said second group and means for applying a potential difference between said first and second groups.

16. A mode coupler as defined by claim 15 wherein each electrode of said first group and second group comprises a ring electrode disposed coaxially with respect to section of dielectric optical waveguide, said ring electrodes disposed in an irregular serial array in a direction parallel to said direction of propagation such that electrodes of said first group alternate with electrodes of said second group.

17. A mode coupler as defined by claim 16 wherein said core of said section of dielectric optical waveguide is nitrobenzene.

18. A mode coupler as defined by claim 17 wherein said core of said section of dielectric optical waveguide is meta-nitroanaline.

19. A mode coupler as defined by claim 18 wherein said meta-nitroanaline is crystaline with a c-axis parallel to said direction of propagation.

20. A mode coupler for transferring energy between different modes of propagation in a dielectric optical waveguide, comprising a section of dielectric optical waveguide having a core of homogeneous phase and a cladding having a plate electrode disposed tangentially adjacent a surface of said section of dielectric optical waveguide and externally of said cladding, a plurality of strip electrodes disposed tangentially adjacent said surface of said section of dielectric optical waveguide and externally of said cladding in a serial array along said section of dielectric optical waveguide, each of said strip electrodes disposed axially transverse of said section of dielectric optical waveguide and diametrically opposite said plate electrode, said plurality of strip electrodes electrically isolated from said plate electrode.

21. A mode coupler as defined in claim 20 wherein said plurality of strip electrodes are equispaced.

22. A mode coupler as claimed in claim 20 wherein each of said plurality of strip electrodes are separated from adjacent electrodes by distances which are randomly valued between predetermined limits.

23. A mode coupler for transferring energy between different modes of propagation in a dielectric optical waveguide comprising a section of dielectric optical waveguide having a core of homogeneous phase and a cladding a first group and a second group of strip electrodes disposed tangentially adjacent said surface of said section of dielectric optical waveguide and externally of said cladding in serial arrays along said section of dielectric optical waveguide, each of said strip electrodes disposed axially transverse of said section of dielectric optical waveguide, each strip electrode of said first group disposed diametrically opposite with respect to said dielectric optical waveguide, a strip electrode of said second group, and said first group of strip electrodes electrically isolated from said second group of strip electrodes.

24. A mode coupler as claimed in claim 23 wherein the strip electrodes of said first group are equi-spaced and the strip electrodes of said first group are equi-spaced.

25. A mode coupler as claimed in claim 23 wherein each of the electrodes of said first group are separated from adjacent electrodes by distances which are randomly valued between predetermined limits, and each of the strip electrodes of said second group are separated from adjacent electrodes by distances which are randomly valued between predetermined limits.

26. A mode coupler for transferring energy between different modes of propagation in a dielectric optical waveguide comprising a section of dielectric optical waveguide having a core of homogeneous phase, a plurality of ring electrodes arranged in a serial array axially of said section of dielectric optical waveguide, each ring electrode disposed circumjacent a surface of said section of dielectric optical waveguide and externally of said cladding.

27. A mode coupler as claimed in claim 26 wherein said ring electrodes are equi-spaced.

28. A mode coupler as claimed in claim 26 wherein said ring electrodes are separated from adjacent electrodes by distances which are randomly valued between predetermined limits.

* * * * *